United States Patent [19]
Foss

[11] Patent Number: 5,380,427
[45] Date of Patent: Jan. 10, 1995

[54] SMALL BATCH WASTE MATERIAL TREATMENT APPARATUS AND SYSTEM

[76] Inventor: Milton K. Foss, 81 W. Vancouver Dr., Port Townsend, Wash. 98368

[21] Appl. No.: 932,795

[22] Filed: Aug. 20, 1992

[51] Int. Cl.[6] .............................................. B01D 21/02
[52] U.S. Cl. ..................................... 210/95; 210/201; 210/208; 210/219
[58] Field of Search .................. 210/94, 95, 201, 208, 210/219

[56] References Cited

U.S. PATENT DOCUMENTS

| | | | |
|---|---|---|---|
| 4,038,186 | 7/1977 | Potter et al. | 210/95 |
| 4,260,488 | 4/1981 | Condolias | 210/208 |
| 4,416,764 | 11/1983 | Gikis et al. | 210/208 |
| 4,536,286 | 8/1985 | Nugent | 210/241 |
| 4,769,154 | 9/1988 | Saylor et al. | 210/707 |
| 4,818,392 | 4/1989 | Werner et al. | 210/202 |
| 4,927,543 | 5/1990 | Bablon et al. | 210/208 |

*Primary Examiner*—Robert A. Dawson
*Assistant Examiner*—W. L. Walker
*Attorney, Agent, or Firm*—Craine & Jackson

[57] ABSTRACT

A treatment apparatus and system for treating small batches of waste material from a septic tank or holding tank of a portable restroom service truck. The apparatus includes at least one processing tank capable of holding a small batch of waste material. The processing tank is designed to function as a processing tank in which oxidation of the waste material occurs and as a separation tank in which the oxidized waste material is separated into sludge and waste water. The processing tank has an upper section and a lower hopper section with a discharge pipe attached to the hopper section. Viewing ports are manufactured on the front surface of the processing tank which enables the operator to determine the amount of waste material placed inside the processing tank and to view the oxidation and separation processes occurring therein during treatment. A mixer is also provided which is used to mix the waste material. The system includes the apparatus along with a safe, inexpensive, easy-to-use oxidizing agent, such as sodium hypochlorite, hydrogen peroxide, and calcium hypochlorite, and a flocculating agent.

4 Claims, 5 Drawing Sheets

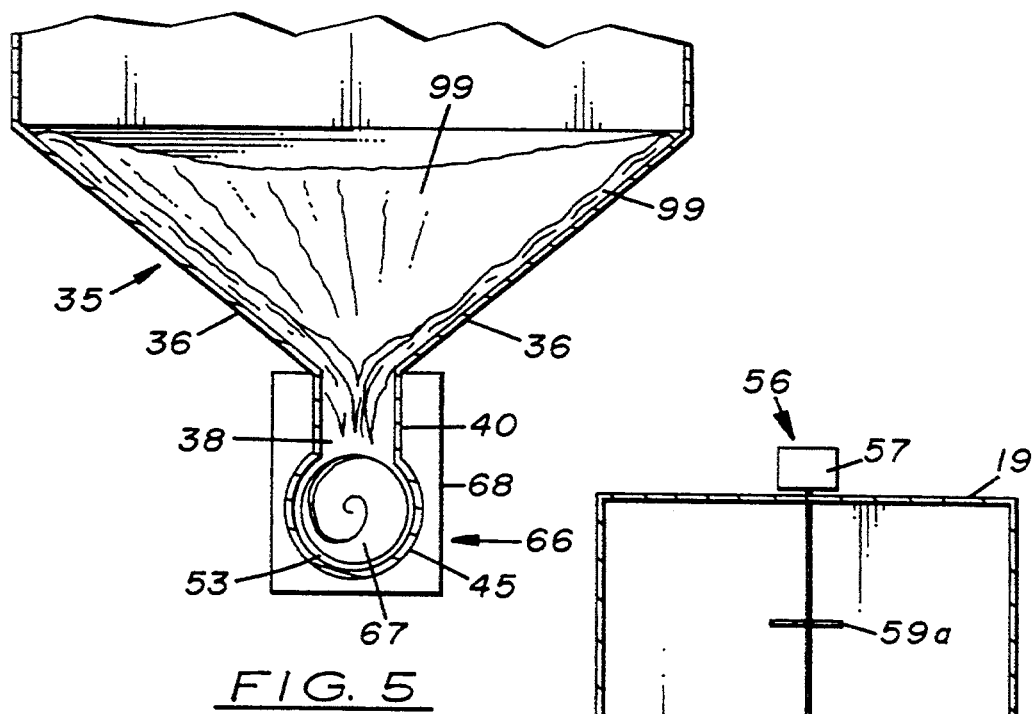
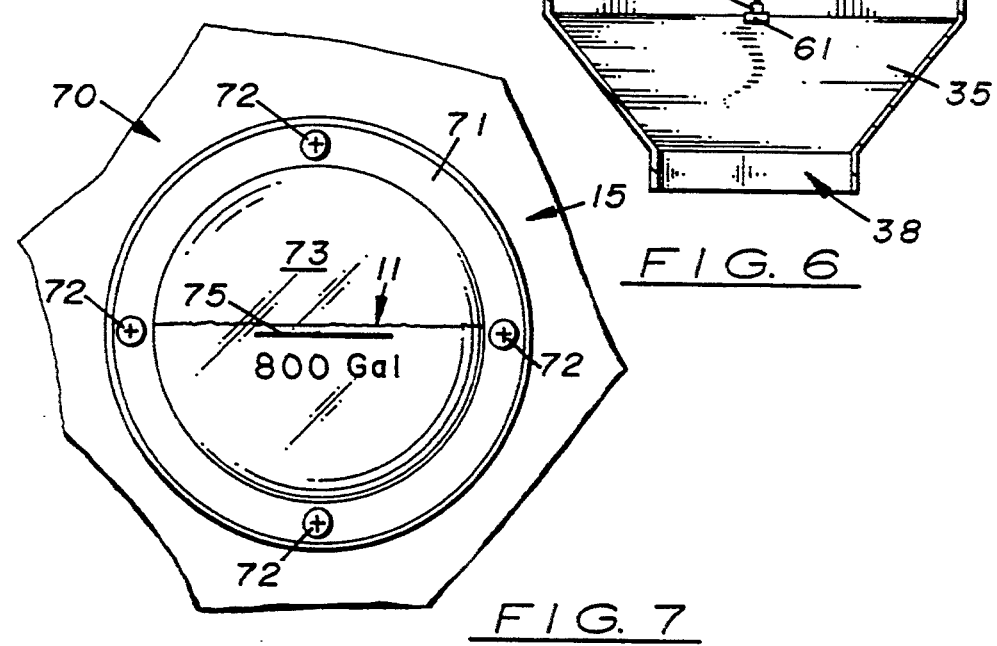

SMALL BATCH WASTE MATERIAL TREATMENT APPARATUS AND SYSTEM

BACKGROUND OF THE INVENTION

1. Field of the Invention

The invention disclosed herein relates to apparatus and systems used to purify and separate liquids and, more particularly, to apparatus and systems used to purify and separate human waste material taken from septic tanks or portable restrooms.

2. Description of the Related Art

Small-scale apparatus and systems used to treat human waste material from household septic tanks or portable restrooms are very desirable. Such apparatus and systems would enable septic tank service companies and portable restroom rental companies to efficiently process relatively small quantities of human waste material.

Septic tank service companies and portable restroom rental companies collect several hundred gallons of human waste material daily from septic tanks and portable restroom units, respectively. Typically, the waste material is temporarily collected and stored in holding tanks and then delivered to a local municipal sewer treatment facility.

Unfortunately, many municipal sewer treatment facilities in operation today will not accept such relatively large volumes of effluent waste material. Because the effluent waste material has relative high "BOD" (biochemical oxygen demand) value, the sudden introduction of large volumes of this material can disrupt the facility's sewer treatment process. Septic tank service companies and portable restroom rental companies, therefore, must find and then transport their waste material considerable distances to facilities which will accept it.

One solution to this problem is for such companies to partially treat the waste material to reduce its "BOD" value making it more accepted to the local municipal sewer treatment facility.

Another solution would be for the septic tank service companies and portable restroom rental companies to recycle a portion of the waste material so that the volume of waste material delivered to the municipal sewer treatment facility is reduced. If such companies could pretreat and then separate the waste material into waste water and sludge, the waste water could then be deposited back into the septic tank or into a nearby sewer line. For portable restroom rental companies, a portion of the waste water could also be used in clean up or reused in the portable restroom unit. For each company, the sludge could be processed "on-site" into top soil or transported to a compost treatment facility.

Today, chemical oxidation is a known method for treating waste material. In chemical oxidation, an oxidizing agent, such as chlorine gas, is dissolved in the waste material which disinfects and chemically oxidizes it. Saylor, U.S. Pat. No. 4,769,154, discloses a waste material treatment method designed for small communities or factories which uses chemical oxidation. In Saylor, a batch (approximately 85–86,000 gallons) of waste material is pumped into a receiving tank. The pH of the batch of waste material is then adjusted to approximately 7.0 using sodium hydroxide which reportedly reduces noxious odors and increases oxidation of the waste water material. After the pH has been adjusted, the batch of waste material is then transferred to a reactor chamber where pressurized chlorine gas is dissolved therein to oxidize the organic solid material. After the waste material is sufficiently oxidized, it is then transferred to a separation receptacle where the solids are allowed to float to the surface to form sludge. A polymer flocculating agent may be added to the waste material to facilitate the flocculation. The waste water, which is located below the sludge, is then rapidly drained from the separation receptacle leaving the sludge behind.

In spite of the improvements made by the treatment method disclosed in Saylor, it has several drawbacks which prevent it from being used on a smaller scale by septic tank service companies or portable restrooms rental companies. First, as noted above, the treatment method uses sodium hydroxide to raise the pH of the batch of waste material. Not only is sodium hydroxide dangerous to use, but also has been shown to be unnecessary for smaller volumes of waste material, (less than 2,000 gallons). Another drawback with using sodium hydroxide is that it may raise the pH of the waste water to unacceptable levels which make it undesirable for deposit at a municipal sewer treatment facility.

A second drawback with the treatment method disclosed in Saylor is that it uses pressurized chlorine gas to oxidize the organic particles in the waste material. Because chlorine gas is dangerous and requires special equipment and handling procedures, it is not well suited for use by septic tank service or portable restroom rental company personnel. In addition, many jurisdictions have regulations which strictly regulate the shipment, storage, and use of chlorine gas.

A third drawback with the treatment method disclosed in Saylor, is that it requires several large components such as a holding tank, a reactor tank, a separation receptacle, and various pumps, valves, and pipes. Not only are these components expensive to manufacture and operate, but also decrease the portability of tile system. Although Saylor discloses a portable embodiment of the invention, actual transporting these components on a trailer or truck bed is not practical.

A small batch waste material treatment apparatus and system which may be used by septic tank service companies or portable restroom rental companies, which do not have the above mentioned drawbacks would be very desirable.

SUMMARY OF THE INVENTION

It is a general object of the present invention to provide an apparatus and system that can be used to treat relatively small batches of human waste material collected from household septic tanks or portable restrooms.

It is an object of the invention to provide such an apparatus and system which can be safely, economically, and easily used to reduce the "BOD" value of the waste material so that it is more acceptable to municipal sewer treatment facilities.

It is another object of the invention to provide such an apparatus and system which may be used to separate the waste material into reusable waste water and sludge.

Discloses herein is an apparatus and system for treating small batches of human waste material collected from household septic tanks or a plurality of portable restroom units. The apparatus comprises a single receptacle designed to hold one or more relatively small batches of waste material (approximately 1000 to 2000 gallons each). The receptacle may be constructed on a trailer or truck bed to make it transportable or constructed in a fixed location.

The receptacle is designed to serve both as a processing tank and as a separation tank. In one embodiment, the receptacle has a vertical partition disposed transversely inside which divides it into two smaller, equal size processing tanks. An optional connection tube with a two-way valve is connected between the two processing tanks which enables the operator to selectively distribute the volume of waste material between the two processing tanks.

Attached to the bottom of each processing tank is a v-shaped, hopper section which directs the waste water and sludge into a discharge pipe located below each processing tank for easier removal. Each discharge pipe has a two-way valve which enables the operator to selectively control the inlet and outlet of waste material from the processing tank. A mixer is placed inside each processing tank which is used to mix the waste material and oxidizing and flocculating agents together during treatment. Each processing tank also has an outer vertical surface with a plurality of vertically distributed viewing ports manufactured thereon which allows the operator to determine the amount of waste material in the processing tank and to view the chemical and physical processes taking place inside the processing tank during treatment.

The system disclosed herein comprises the above stated apparatus together with a non-gaseous, relatively safe, inexpensive, easy to use oxidizing agent together with a flocculating agent. During use, the collected waste material is first pump through one of the discharge pipes and into one or both processing tanks. The operator uses the volume indicating lines located on the surface of the viewing ports to determine the total volume of waste material deposited in each processing tank. The operator uses the two-way valve attached to the connection tube disposed between the two processing tanks to control distribution of the waste material between the two processing tanks.

After one or both processing tanks have been filled with the desired amount of waste material, a small sample of waste material is removed from a processing tank. The desired amount of oxidizing agent and flocculating agent needed to oxidize and to separate the waste material in each processing tanks is then determined by adding a small sample of oxidizing agent and flocculating agent to the sample and observing the results. From the amounts of oxidizing and flocculating agents needed to treat the sample, the amount of oxidizing and flocculating agents required to treat the volume of waste material located in each processing tank is determined. After the required amount of oxidizing and flocculating agents have been determined and added to each processing tank, the mixer is used to mix the agents and waste material together. As the mixing occurs, the operator observes the chemical and physical processes occurring at different depths in the waste material located inside the processing tank through the viewing ports.

When the chemical reactions are completed, the mixers are turned off and the waste material is allowed to separate into two components—sludge and waste water. During the separation process, the sludge floats on the surface of the waste water. After separation has occurred, the two-way valve connected to the discharge pipe is opened to allow the waste water to drain from the processing tank. As the waste water is removed, the sludge settles into the hopper section which directs it into the discharge pipe. The auger is then used to forcibly remove the sludge from the discharge pipe.

In summary, the apparatus and system provides a safe, easy to use, and economical way to treat relatively small volumes of human waste material. The apparatus is relatively compact and may be constructed in various sizes for treating waste material from one or more septic tanks or portable restrooms. The apparatus may be constructed to have a single processing tank or a plurality of processing tanks. The apparatus is also designed to be used with a safe, easy-to-use, non-gaseous oxidizing agent which reduces the "BOD" value of the waste water making it more acceptable for municipal sewer treatment facilities.

After oxidation, the receptacle tank serves as a separation vessel wherein the waste material separates into waste water and sludge. The hopper section below each processing tank facilitates removal and cleanup by directing the waste water and sludge into the discharge pipe. The discharge pipes enable the waste water to be easily deposited either back into the septic tank or portable restroom, or directly into a municipal sewer treatment facility. The relatively small amount of sludge produced in each processing tank may be deposited on-site or transported to an off-site facility.

The augers are used to facilitate removal of the sludge from the processing tanks. The augers may also be used to mix sawdust or other materials in the sludge to thicken it and to make top soil. An additional benefit of using augers to remove the sludge from the processing tanks, is that purity of sludge is increased. During the removal process, the augers create pressure which forces the oxidizing agent into the cells of resistant microorganisms found in the sludge. As a result, the sludge produced using the apparatus and system is more pure than sludge produced by prior art waste material treatment methods.

BRIEF DESCRIPTION OF THE DRAWINGS

FIG. 5 is a sectional view of the hopper section and discharge pipe.

FIG. 6 is a elevational view of the mixer inside a processing tank.

FIG. 7 is a plan view of a viewing port.

DESCRIPTION OF THE PREFERRED EMBODIMENT(S)

Shown in the accompanying FIGS. 1-4, there is shown an apparatus and system, generally referred to as 12 and 80, respectively, designed to provide a safe, economical, and easy method for processing small batches of waste material from septic tanks or portable restrooms into reusable waste water and sludge.

Figure 1:
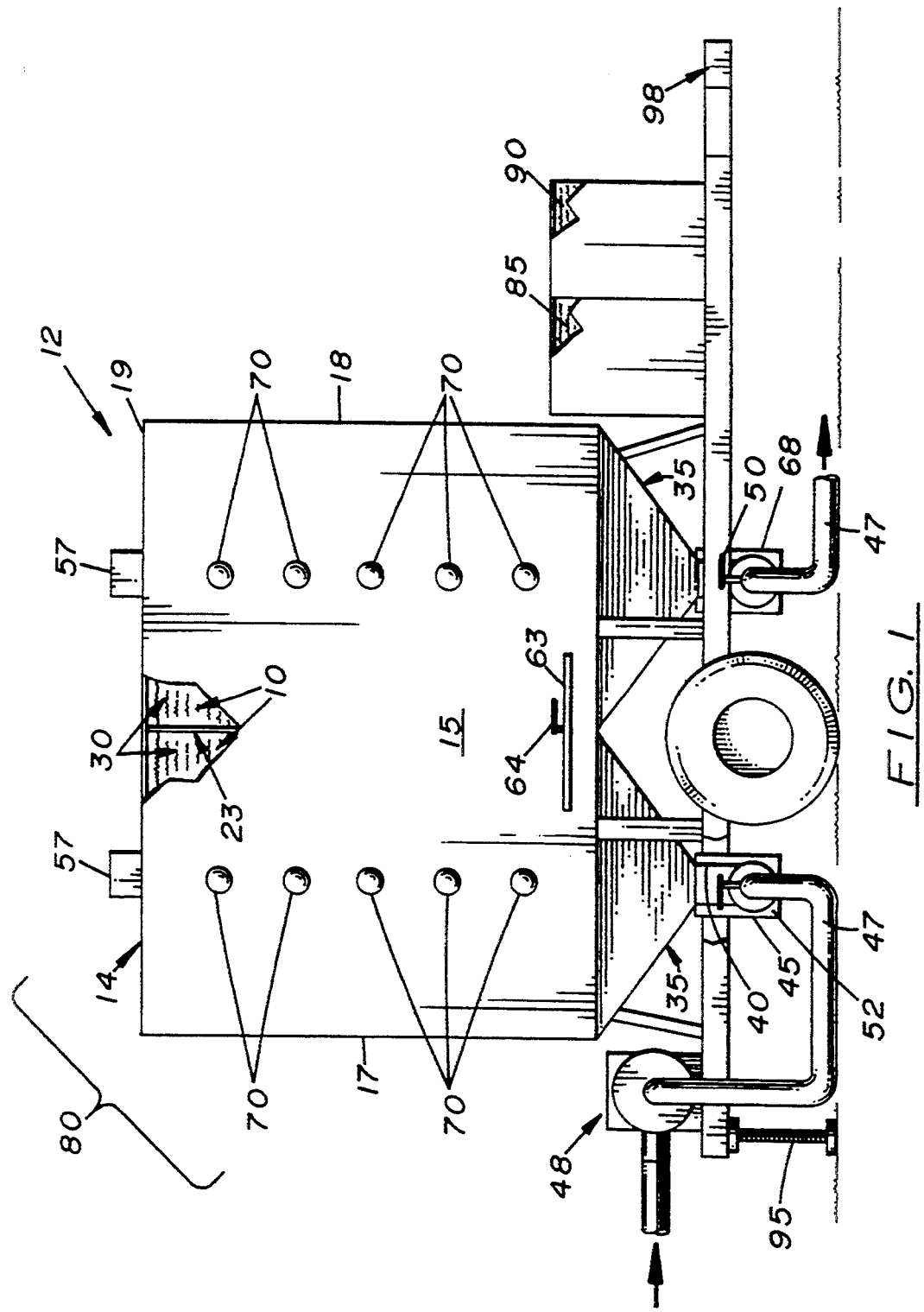
FIG. 1 is a front elevational view of the apparatus and system attached to a trailer.
Figure 2:
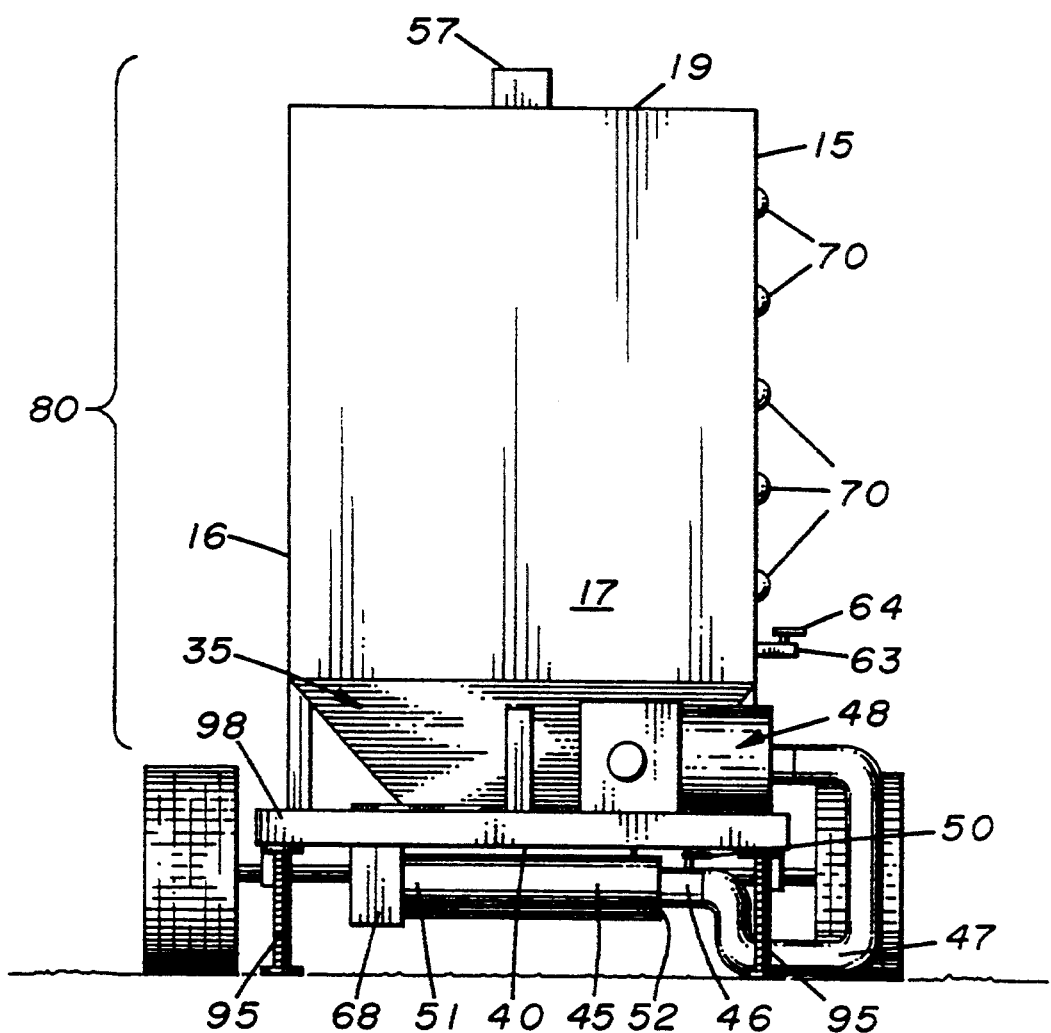
FIG. 2 is a right side elevational of the apparatus and system shown in FIG. 1.

As shown in FIGS. 1-2, the preferred embodiment of the apparatus 12 comprises a single receptacle 14 divided by a transversing, vertical disposed partition 23 into two, equal size, processing tanks 30. The receptacle 14 is designed to hold up to approximately 2000 gallons of waste material 10 with each processing tank 30 designed to hold up to approximately 1000 gallons. The upper portion of the receptacle 14 is square or rectangular-shaped in cross section with a vertical front side 15, a vertical back side 16, a vertical left side 17, a vertical right side 18, and a horizontal top surface 19.

The lower portion of each processing tank 30 is a v-shaped hopper section 35. The lower surfaces 36 of each hopper section 35 are sloped downward and converge toward the vertical center line of the processing tank 30 and terminate to form a rectangular-shaped discharge opening 38. A hollow, rectangular-shaped discharge neck section 40 is attached to the descending edges of the lower surfaces 36 of the hopper section 35 to create a continuous pathway into a 6 inch diameter discharge pipe 45 welded to the lower portion of the discharge neck section 40. A short, 3 inch diameter outlet pipe 46 is attached to the front surface 52 of the discharge pipe 45 which enables a standard size 3 inch diameter hose 47 to be connected to the discharge pipe 45. A two-way valve, hereinafter called a lower valve 50, is attached to the outlet pipe 46 near front surface 52 which enables the operator to selectively control the direction of flow of waste material 10 into and out of the processing tanks 30.

Figure 3:
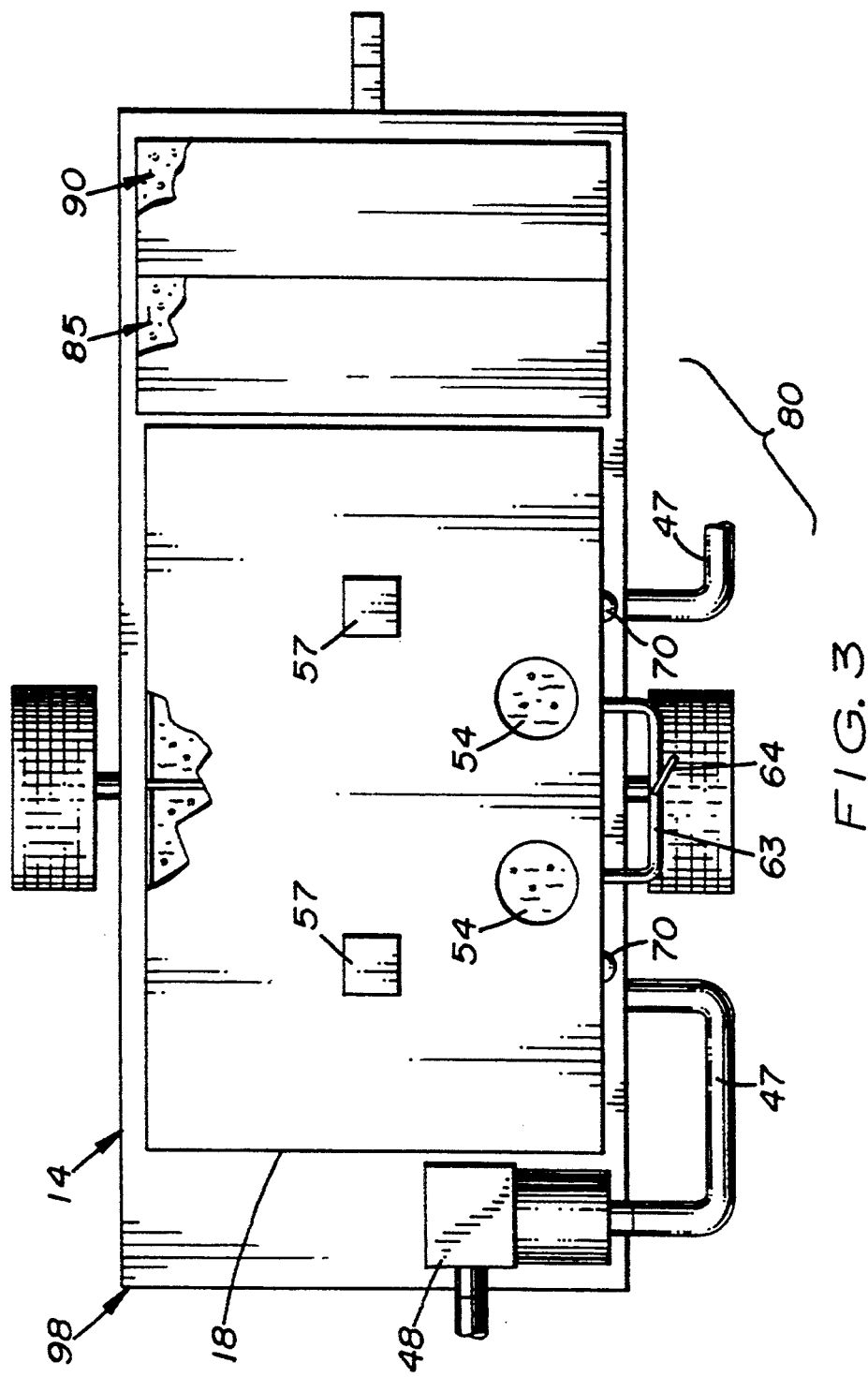
FIG. 3 is a top, plan view of the apparatus and system shown in FIGS. 1-2.
Figure 4:
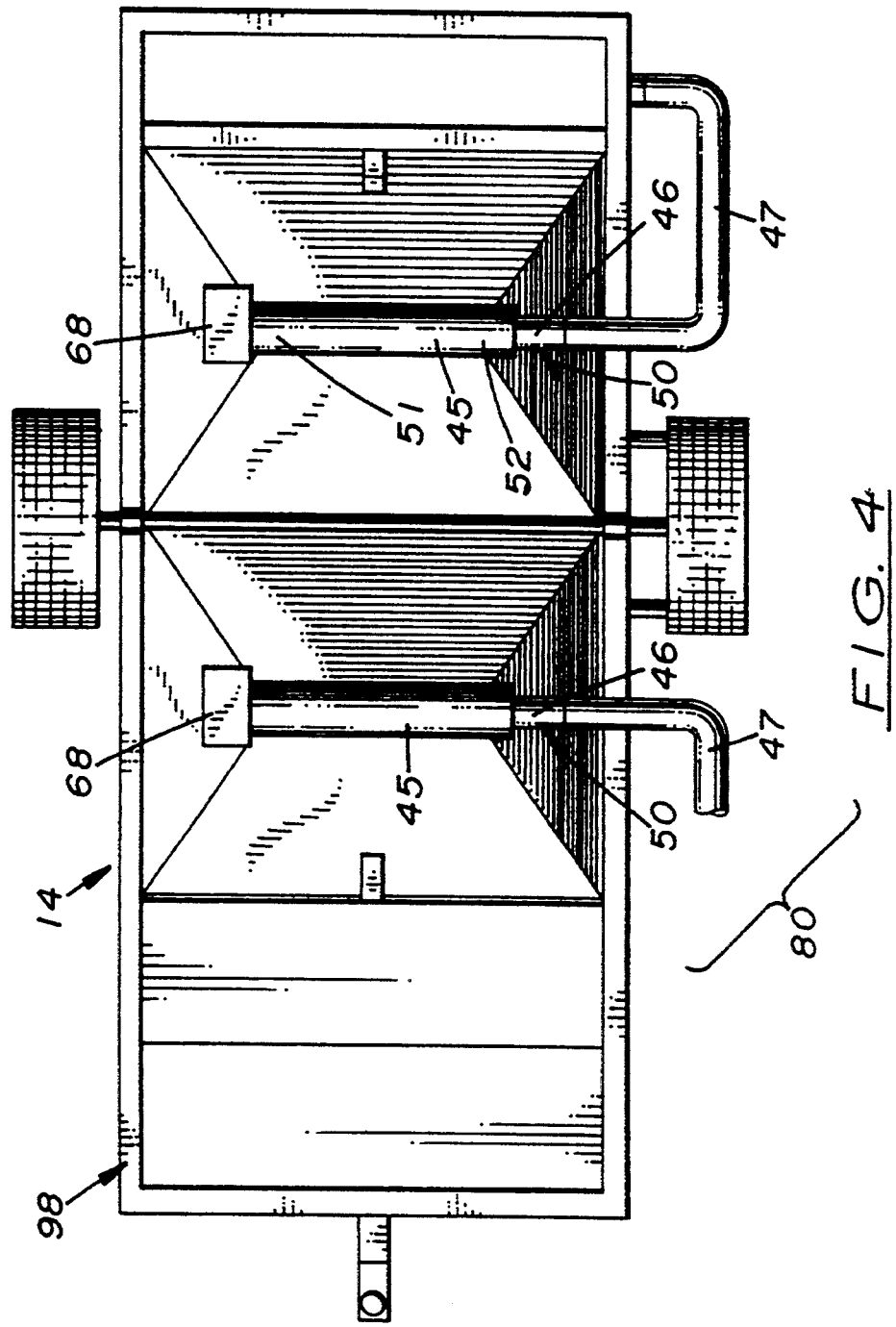
FIG. 4 is a bottom, plan view of the apparatus and system shown in FIGS. 1-3.

As shown in FIG. 3, a round entry port 54 measuring approximately 12 inches in diameter is manufactured on the horizontal top surface 19 of the receptacle 14 over each processing tank 30. Each port 54 is off-centered over each processing tank 30 so that a mixer motor 57 may be centrally located therein.

As shown in FIGS. 1–3, a 3 inch diameter connection pipe 63 with a two-way manual valve, hereinafter known as an upper valve 64, is connected between the lower sections of the two processing tanks 30 to enable the operator to control the distribution of waste material 10 between the two processing tanks 30 during the filling process.

As shown in FIGS. 2 and 5, an auger 66 is disposed inside the passageway 53 of the discharge pipe 45 which is used to forcibly remove the sludge 99 therefrom after treatment. The auger 66 comprises an auger bit 67 attached at one end to a 1 hp. hydraulic or electric motor 68. The motor 68 is attached at the back surface 51 of the discharge pipe 45.

As shown in FIG. 6, each processing tank 30 has a mixer 56 comprising a 1 horsepower electric or hydraulic mixer motor 57, an elongated shaft 58, and two, four-bladed propellers 59a and 59b. The mixer motor 57 is attached securely to the outside surface of top surface 19. The upper end of the shaft 58 extends through the top surface 19 and connects to the armature on the mixer motor 57 while the opposite lower end extends vertically and centrally into the processing tank 30 towards the hopper section 35. The lower end of the shaft 58 is inserted into a bearing connector 60 which is supported and held in place directly over the discharge opening 38 by a horizontal bar 61 which traverses across the upper region of the hopper section 35. In the preferred embodiment, the upper propeller 59a is positioned approximately three feet below the top surface 19 while the lower propeller 59b is positioned approximately one and one-half feet above the upper region of the hopper section 35.

On the section of the vertical front surface 15 adjacent to each processing tank 30 are five viewing ports 70. The viewing ports 70 are designed and positioned on front surface 15 to enable the operator to determine the amount of waste material 10 pumped inside each processing tank 30. The viewing ports 70 also enable the operator to visually monitor the chemical and physical processes taking place inside each processing tank 30 during treatment. As shown in FIG. 7, each viewing port 70 is circular in shape and are made of durable, transparent surface 73 made of plastic or glass material. Each viewing port 70 has a circular flange surface 71 which is held in place on the outside surface of front surface 15 by suitable connectors 72. Horizontally disposed, volume indicating lines 75 are manufactured or printed on the transparent surface 73 of each viewing port 70. The viewing ports 70 are vertically aligned and centrally located along the section of front surface 15 adjacent to each processing tank 30. The viewing ports 70 are vertically spaced apart so that when the top surface of the waste material 10 inside the processing tank 30 is aligned with one of the volume indicating lines 75 on a viewing port 70, the operator can accurately determine the amount of waste material 10 deposited inside the processing tank 30. In the preferred embodiment, there are five viewing ports 70 positioned from top to bottom along the front surface 15 so that the volume indicating lines 75 indicate the following total volume amounts: 800 gallons, 650 gallons, 500 gallons, 350 gallons, and 200 gallons.

The receptacle 14 and hopper sections 35 are made of 3/16 inch thick steel plate material welded together at the adjoining edges to form a leak-proof vessel. Alternatively, the receptacle 14 and hopper sections could be made of aluminum or stainless steel plate material. The receptacle 14 may be manufactured in different sizes dependent upon its intended use.

As stated above, a system 80 of treating the waste material 10 from one or a plurality of septic tanks or portable restroom units is also provided. As shown in FIGS. 1–4, the system 80 comprises the above described apparatus 12, an oxidizing agent 85, and a flocculating agent 90. The entire system 80 may be assembled either on a trailer 98 or truck bed (not shown) for easy transport or assembled in a fixed location.

Unlike other waste material treatment systems, the system 80 uses a safe, economical, easy-to-use, non-gaseous oxidizing agent 85 to oxidize the waste material 10 inside the apparatus 12. Oxidizing agents 85 found useful with the invention include calcium hypochlorite, commonly found in swimming pool cleaning products which delivers approximately 60% chlorine by weight, and sodium hypochlorite, commonly used in bleach products as a 5–6% aqueous solution. Another type of oxidizing agent 85 found useful with the system 80 is 30% hydrogen peroxide. Other possible oxidizing agents 85 include potassium hypochlorite, sodium dichloro-5-triaznetrione, and sodium dichloro-5 diaznetrione.

In the preferred embodiment, a stock solution of the oxidizing agent 85 is used in the system 80 since solutions are easier to measure and use than dry powders or granules. Although all of the above-mentioned oxidizing agents 85 may be used with the apparatus 14, the particular oxidizing agent 85 used during treatment will depend upon its cost and availability. For example, 5.25% aqueous solution of sodium hypochlorite is often used since it is relatively inexpensive and widely available as a laundry bleach product, such as CLOROX, distributed by The Chlorox Company. An aqueous solution of 30% hydrogen peroxide is also widely available and relatively expensive. Calcium hypochlorite is widely available from swimming pool product suppliers although slightly more expensive than sodium hypochlorite and hydrogen peroxide.

Any conventional flocculating polymer may be utilized to facilitate flocculation of the fine particles in the waste material. Tests have shown that cationic-type flocculating polymers are more effective than anionic or neutral flocculating polymers. One type of cationic-type flocculating polymer shown to be useful is provided by Allied Colloids, Inc. and sold under the name PERCOL 757. Although the flocculating polymers are generally available in solid form, it is more desirable to create a stock 1-2% aqueous solution of it by mixing approximately 8.5 lbs of the flocculating polymer with 200 gallons of water.

To begin treatment, the system 80 is delivered or assembled at the treatment site. The top surface 19 of the receptacle 14 is placed approximately horizontally to ensure accurate measurement of the waste material 10 when pumped inside the processing tanks 30. Waste material 10 from a septic tank or a holding tank of a portable restroom service truck is then pumped into each processing tank 30 through one of the discharge pipes 45 using a conventional pump 48. The upper valve 64 attached to the connection pipe 63 located between the two processing tanks 30 is used to control the distribution of the waste material 10 between the two processing tanks 30. The volume indicating lines 75 located on the surface of each viewing port 70 are used to determine the total volume of waste material 10 placed inside each processing tank 30.

After pumping the desired amount of waste material 10 into each processing tank 30, the lower valve 50 is closed. Generally, the operator begins treating the waste material 10 in one processing tank 30 before treating the waste material 10 in the second processing tank 30. A small, known volume of waste material 10, approximately 1000 mls., is first removed from one processing tank 30 and placed into a suitable size graduated cylinder. Using a pipet, approximately 0.5 to 1% (v/v) or 5-10 mls. of liquid oxidizing agent 85 is initially added and mixed thoroughly in the sample. Oxidation begins immediately as evidenced by the sample of waste material 10 turning lighter in color.

After observing the sample to ensure that oxidation of the sample is occurring, approximately 5-10 mls. of the liquid flocculating agent 90 is added and mixed thoroughly in the sample. After a few minutes of mixing, the operator observes the sample to determine whether separation of the solids from the waste water is occurring. During the separation process, the suspended solids in the waste material 10 will rise and float on the surface. After few minutes, a distinct upper layer of sludge is formed over a layer of waste water. At the same time, the fine particles in the waste water will begin to flocculate and float to the surface.

If adequate separation or flocculation has not occurred in the sample, the operator will add approximately 5 mls. of the oxidizing agent 85 or the flocculating agent 90 to the sample. If adequate separation or flocculation has still not occurred, the operator will continue to add alternatingly, 5 mls. portions of oxidizing agent 85 and flocculating agent 90 to the sample. When the total amount of oxidizing agent 85 and flocculating agent 90 added to the sample exceeds 30 mls., the operator will discard the sample and starts the entire process over with a new sample.

If a solid oxidizing agent 85, such as calcium hypochlorite, is used in place of a liquid oxidizing agent 85, the weight of the solid oxidizing agent 85 added to the 1000 ml. sample must first be determined. With solid oxidizing agents 85, the operator initially adds approximately 0.5-1% (w/v), or 5-10 grams per 1000 mls., to the sample.

The actual amounts of oxidizing agent 85 and flocculating agent 90 needed to oxidize and separate a given sample of waste material 10 will depend upon several factors, such as the age and type of waste material 10. Fresh waste material 10 taken from septic tanks or portable restrooms require, generally, less oxidizing agent 85 than older waste material 10. The sequence used to add the oxidizing agent 85 and flocculating agent 90 to the waste material 10 can also have an impact on the oxidation and separation processes. Normally the oxidizing agent 85 is added and mixed in the waste material 10 before the flocculating agent 90. In some cases, mixing the oxidizing agent 85 and flocculating agent 90 together before adding them to the waste material 10 has produced negative results.

Based on the amounts of oxidizing agent 85 and flocculating agent 90 added to the sample, the operator can determine the amounts of oxidizing agent 85 and flocculating agent 90 needed to be added to the total volume of waste material 10 in each processing tank 30. For example, if 1000 gallons were pumped into each processing tank 30, and 10 mls. of 5.25% sodium hypochlorite or 30% hydrogen peroxide were needed to oxidize 1000 mls. of waste material 10, approximately 10 gallons of sodium hypochlorite or hydrogen peroxide would be needed to oxidize 1000 gallons of waste material 10 in each processing tank 30. If approximately 0.5 grams of calcium hypochlorite were added to the 1000 mls. sample, approximately 1,870 grams or 4.1 lbs. would need to be added to each processing tank 30. The same calculations are carried out to determine the amount of flocculating agent 90 that needs to be added to each processing tank 30.

After determining the amount of oxidizing agent 85 and flocculating agent 90 that needs for each processing tank 30, the operator then adds the required amount of oxidizing agent 85 to one of the first processing tanks 30 through its entry port 54. The mixer 56 is then used to mix the oxidizing agent 85 and waste material 10 together. After mixing the oxidizing agent 85 in the waste material 10, the flocculating agent 90 is then added through the entry port 54. The mixer 56 is then used to mix the agents 85, 90 and waste material 10 together for approximately 5 to 30 minutes.

During the mixing process, oxidation of the waste material 10 occurs inside the processing tank 30. The oxidation process can be seen through the viewing ports 70 as the waste material 10 turns lighter in color. The rate of oxidation at different levels inside the processing tank 30 can be seen through the viewing ports 70.

When the oxidation process appears to be completed at every depth in the processing tank 30, the mixer 56 is turned off and the waste material 10 is allowed to separate into two components—sludge and waste water. The separation process, which is visible through the viewing ports 70, takes generally 20 to 40 minutes. The solids float on the surface of the waste water and will remain there for a considerable period of time if not disturbed.

After the separation process has occurred, one end of the hose 47 is attached to the discharge pipe 40 and the other end is inserted into the opening of a septic tank, sewer line, or portable restroom service truck holding tank. The lower valve 50 is then opened to allow the waste water 80 to drain from the processing tank 30.

Approximately, 5/10th to 6/10th cubic yards of sludge 99 with a consistency of 20% (solid /water) is created from 1000 gallons of waste material 10. As shown in FIG. 5, when the waste water has been drained from the processing tank 30, the sludge 99 settles into the hopper section 35. The sloped sides 36 of the hopper section 35 direct the sludge 99 through the discharge opening 38 and into the discharge pipe 45. When the sludge 99 enters the discharge pipe 45, the motor 68 attached to the auger bit 67 is turned on to forcibly remove the sludge 99 therefrom.

After treatment and separation, the waste water contains very few suspended particles and is considered to be relatively clean. It can then be redeposited into the septic tank or portable restroom unit. If residual oxidizing agent 85 is found in the waste water, it may cause the waste water to be too sterile for redeposit into the septic tank or portable restroom unit. In this situation, a bacteria containing product may be added to the septic tank so that it operates properly. Because the waste water has a reduced "BOD" value and a pH of approximately 7, it may also be deposit directly in a sewer line for delivery to a municipal sewage treatment facility.

The sludge 99 produced by the system 80 may be processed into top soil by adding sawdust or other light soil material to it. The auger 66 may be used to mix the sludge 99 and sawdust or light soil material together. Alternatively, the sludge 99 can be delivered and deposited at a compost treatment facility. Although the auger 66 is used to forcibly remove the sludge 99 from the apparatus 12, it is postulated that it also forces the oxidation agent 85 into the cells of some bacterial heretofore considered resistant to commonly used waste water treatment methods. Tests have shown that the auger 66 applies approximately 50 lbs per inch pressure to the sludge 99 during the removal process. Such pressure appears to force the oxidizing agent 85 into the cell bodies of the resistant bacteria, such as Helminth ova, thereby killing it.

When the system 80 is assembled on a trailer 98 or the bed of a large truck (not shown), leveling jacks 95 may be used by the operator to adjust the position of the processing tank 30 so that the waste material 10 inside each processing tank 30 is approximately level.

In compliance with the statute, the invention, described herein, has been described in language more or less specific as to structural features. It should be understood, however, the invention is not limited to the specific features shown, since the means and construction shown comprised only the preferred embodiments for putting the invention into effect. The invention is, therefore, claimed in any of its forms or modifications within the legitimate and valid scope of the amended claims, appropriately interpreted in accordance with the doctrine of equivalents.

I claim:

1. A small batch waste material treatment apparatus, comprising:
   a. an receptacle divided into two processing tanks by a vertical disposed partition, each said processing tank capable of holding a small batch of waste material, each said processing tank having a front vertical surface, a top surface, and a lower portion;
   b. a hopper section attached to the lower portion of each said processing tank, said hopper portion having downward converging sides that terminate and create a discharge opening;
   c. a port opening manufactured on said top surface of above each said processing tank enabling said waste material to be deposited inside each said processing tank;
   d. a plurality of viewing ports manufactured on said front surface of each said processing tank, each said viewing port having a volume indication lines, said viewing ports being disposed vertically in selected positions on said front surface so that said volume indication lines may be used to determine the amount of waste material deposited inside said processing tank;
   e. a mixer disposed inside said processing tank capable of mixing said waste material deposited therein, said mixer including a mixer motor and a shaft, said shaft having at least two propellers attached thereto;
   f. a discharge pipe attached to said hopper section below said discharge opening, said discharge pipe having a back end, a front end, and a passageway; tank;
   g. a lower valve attached to said discharge pipe near said front end, said lower valve enabling said waste material to be selectively deposited or removed from said processing tank, and;
   h. an auger disposed inside said discharge pipe capable of forcibly removing any sludge which settles into said discharge pipe during treatment, said auger including an auger bit disposed inside said passageway of said discharge pipe, a motor attached to one end of said auger bit capable of rotating said auger bit in said discharge pipe.

2. A small batch waste material treatment apparatus, comprising:
   a. a receptacle having two adjacent processing tanks each capable of holding a small batch of waste material, each said processing tank having a lower v-shaped hopper section with at least two downward converging sides that terminate and form discharge opening, said processing tank having a front vertical surface and a top surface;
   b. a port opening manufactured on said top surface of each said processing tank;
   c. a set of viewing ports manufactured on said front surface of each said processing tank, each said viewing port being located at different elevations on said front vertical surface so that different depths of said batch of waste material may be viewed when placed inside said processing tank, each said view port having volume indicating lines which enable the volume of said waste material to be determined when placed inside said processing tank;
   d. a mixer disposed inside each said processing tank capable of mixing said waste material deposited therein;
   e. a discharge pipe attached to said each hopper section below said discharge opening;
   f. a lower valve attached to said discharge pipe enabling the flow of said waste material into and out of said processing tank to be selectively controlled, and;
   g. an auger disposed inside said discharge pipe, said auger having means capable of forcible removing any sludge settled in said discharge pipe during the treatment of said waste material, and;

h. a connection tube disposed between said adjacent processing tanks, said connection tube having an upper valve capable of controlling the flow of said waste material between said processing tanks.

3. A small batch waste material treatment apparatus, as recited in claim 2, wherein each said processing tank is capable of holding up to approximately 1000 gallons of said waste material.

4. A small batch waste material treatment apparatus, as recited in claim 3, wherein said view ports are positioned from bottom to top along said front surface and so that said volume indicating lines indicate 200 gallons, 400 gallons, 600 gallons, 800 gallons and 1000 gallons of said waste material deposited in said processing tank.

* * * * *